United States Patent
Lin et al.

(10) Patent No.: US 12,486,355 B2
(45) Date of Patent: Dec. 2, 2025

(54) CARBONATE-CONTAINING EPOXY RESIN, MANUFACTURING METHOD THEREOF, EPOXY CURABLE PRODUCT PREPARED THEREBY AND METHOD FOR DEGRADING EPOXY CURABLE PRODUCT

(71) Applicant: Swancor Innovation & Incubation Co., Ltd., Nantou (TW)

(72) Inventors: Ching-Hsuan Lin, Taichung (TW); Ren-Yu Yeh, Tainan (TW); Yi-Chun Chen, Tainan (TW); Meng-Wei Wang, Taichung (TW); Wen-Chang Chen, Taipei (TW)

(73) Assignee: Swancor Innovation & Incubation Co., Ltd., Nantou (TW)

( * ) Notice: Subject to any disclaimer, the term of this patent is extended or adjusted under 35 U.S.C. 154(b) by 641 days.

(21) Appl. No.: 17/929,938

(22) Filed: Sep. 6, 2022

(65) Prior Publication Data
US 2023/0102899 A1    Mar. 30, 2023

(30) Foreign Application Priority Data
Sep. 28, 2021 (TW) .................. 110136094

(51) Int. Cl.
*C08G 59/40* (2006.01)
*C08G 59/24* (2006.01)
*C08G 64/42* (2006.01)
*C08J 11/28* (2006.01)

(52) U.S. Cl.
CPC ....... *C08G 59/4007* (2013.01); *C08G 59/245* (2013.01); *C08G 64/42* (2013.01); *C08J 11/28* (2013.01); *C08G 2230/00* (2013.01)

(58) Field of Classification Search
CPC ..... C08G 59/3218; C08G 59/40; C08G 59/42
See application file for complete search history.

(56) References Cited

U.S. PATENT DOCUMENTS

| 4,943,619 A | 7/1990 | Bell |
| 5,037,903 A | 8/1991 | Parker |
(Continued)

FOREIGN PATENT DOCUMENTS

| CN | 108623786 A | 10/2018 |
| CN | 112752781 A | 5/2021 |
| EP | 3403800 A1 | 11/2018 |
(Continued)

OTHER PUBLICATIONS

Binbo Wang et al., "Readily recyclable carbon fiber reinforced composites based on degradable thermosets: a review", Green Chemistry, published on Sep. 19, 2019, issue 21, pp. 5781-5796, published by The Royal Society of Chemistry, United Kingdom.
(Continued)

*Primary Examiner* — Vu A Nguyen
(74) *Attorney, Agent, or Firm* — McBee Moore & Vanik, IP, LLC

(57) ABSTRACT

A carbonate-containing epoxy resin and a manufacturing method for a carbonate-containing epoxy resin, an epoxy cured product and a method for degrading an epoxy cured product are provided. The carbonate-containing epoxy resin includes a structure represented by formula (I) or formula (II). Formula (I) and formula (II) are defined as in the specification.

10 Claims, 6 Drawing Sheets

(56) References Cited

U.S. PATENT DOCUMENTS 5,182,344 A 1/1993 Parker
5,556,927 A 9/1996 Fujiwa et al.

FOREIGN PATENT DOCUMENTS

| EP | 3268219 | B1 | | 1/2019 | |
|---|---|---|---|---|---|
| JP | 11302369 | A | | 11/1999 | |
| JP | 2004217784 | A | | 8/2004 | |
| JP | 4621899 | B2 | | 1/2011 | |
| TW | 202144487 | A | | 12/2021 | |
| WO | WO-2020075611 | A1 | * | 4/2020 | ............. C08G 59/22 |

OTHER PUBLICATIONS

Gabriel Rokicki et al., "Six-membered cyclic carbonates—epoxy resins modifiers", Polimery, published on Jan. 13, 2021, vol. 63, No. 2, abstract and schemes A-C, published by Łukasiewicz Research Network—Industrial Chemistry Institute, Poland.

Shih Wei Shao et al., "Full atom-efficiency transformation of wasted polycarbonates into epoxy thermosets and the catalyst-free degradation of the thermosets for environmental sustainability", Green Chemistry, published on Jun. 15, 2020, vol. 22, issue 14, pp. 4683-4696, published by Royal Society of Chemistry, United Kingdom.

Ming-Shiu Li et al., "Epoxy Polycarbonate Blends Catalyzed by a Tertiary Amine. 1. Mechanism of Transesterification and Cyclization", Macromolecules, published on Jan. 15, 1996, vol. 29, issue 2, pp. 499-506, published by American Chemical Society, United States.

Yeh et al., "Preparation and Degradation of Waste Polycarbonate-Derived Epoxy Thermosets and Composites," ACS Appl. Polym. Mater. 2022, 4, 413-424.

* cited by examiner

CARBONATE-CONTAINING EPOXY RESIN, MANUFACTURING METHOD THEREOF, EPOXY CURABLE PRODUCT PREPARED THEREBY AND METHOD FOR DEGRADING EPOXY CURABLE PRODUCT

RELATED APPLICATIONS

This application claims priority to Taiwan Application Serial Number 110136094, filed Sep. 28, 2021, which is herein incorporated by reference.

BACKGROUND

Technical Field

The present disclosure relates to an epoxy resin, a manufacturing method thereof, an epoxy cured product prepared thereby and a method for degrading an epoxy cured product. More particularly, the present disclosure relates to a carbonate-containing epoxy resin, a manufacturing method thereof, an epoxy cured product prepared thereby and a method for degrading an epoxy cured product.

Description of Related Art

At present, the commercially available epoxy resins are mainly bisphenol A type bifunctional and novolac type multifunctional. In the synthesis, the phenolic group reacts with epichlorohydrin to form the epoxy group, and the multifunctional type is based on the phenolic resin, so formaldehyde must be used in the preparation of the phenolic resin. In addition to the environmental issues, this method is unfavorable for the preparation of the high molecular weight multifunctional epoxy. The epoxy resin has a unique three-membered ring structure, which can perform the various ring-opening reactions and can also perform the self-curing by the catalyst. However, due to the difficulty in chain growth, the final homopolymerized cured product has the disadvantage of poor performance. Therefore, most of the epoxy resins need to be copolymerized with the epoxy resin curing agent to improve the degree of crosslinking after curing. In terms of current commercial products, although the cured product has good physical properties, it is also difficult to recycle the product due to the formation of its cross-linked structure, which leads to the increasing issue of such waste.

In generally, thermosetting materials have excellent thermal stability, chemical stability and high-density covalent bond cross-linked network structure, which is not easy to be dissolved and decomposed for recycling. However, if there are unstable bonds in the cross-linked network, the cured product has the potential to be degraded. In the recent years, some studies have pointed out that the ester group has chemically decomposable, and it is gradually applied in PET recycling. Therefore, if the similar concept can be introduced into the epoxy resin, it is expected to have the opportunity to improve the degradability of waste and achieve the purpose of chemical recycling.

However, the preparation of ester group is mainly formed by the reaction of carboxylic acid compounds and phenolic or alcohol compounds, and it is difficult to retain the multifunctional alcohol or phenolic groups for epoxidation during the preparation process. Therefore, the preparation of derivatized epoxy resins is limited, resulting in no related products so far.

Therefore, how to synthesize the epoxy resin containing the carbonate group, and the cured product prepared thereby has chemical degradability, which is the goal of the relevant industry.

SUMMARY

According to one aspect of the present disclosure, a carbonate-containing epoxy resin is provided. The carbonate-containing epoxy resin includes a structure represented by formula (I) or formula (II):

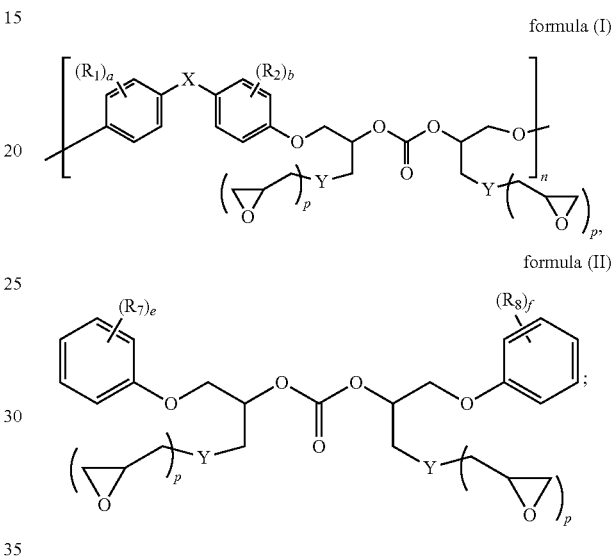

wherein $R_1$, $R_2$, $R_7$ and $R_8$ are each independently a hydrogen atom, an alkyl group of 1 to 6 carbon atoms, an allyl group, an alkoxy group of 1 to 6 carbon atoms, an aryl group of 6 to 12 carbon atoms or a halogen atom, a and b are each independently an integer from 0 to 4, e and f are each independently an integer from 0 to 5. X is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group or a structure represented by formula (i) or formula (ii):

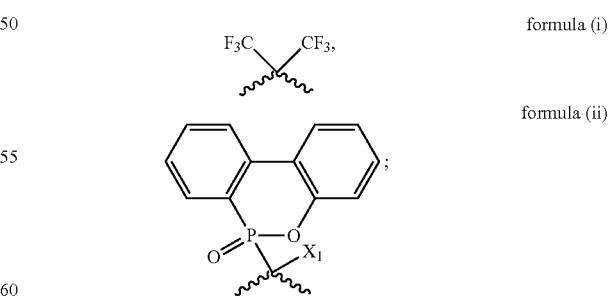

wherein $X_1$ is a hydrogen atom, an alkyl group of 1 to 6 carbon atoms, or an aryl group of 6 to 12 carbon atoms. Y is an alkyl chain of 1 to 12 carbon atoms, an alkyl ether chain of 1 to 12 carbon atoms, isocyanurate or a structure represented by formula (iii), formula (iv) or formula (v):

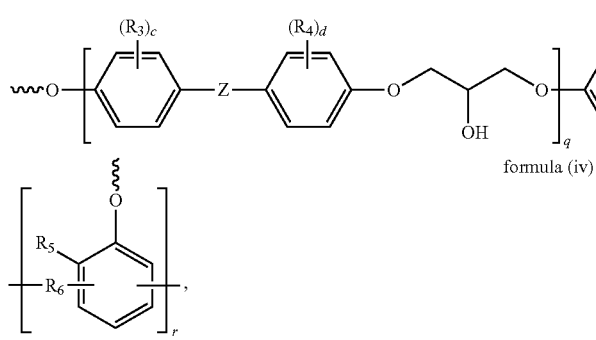

formula (iii)

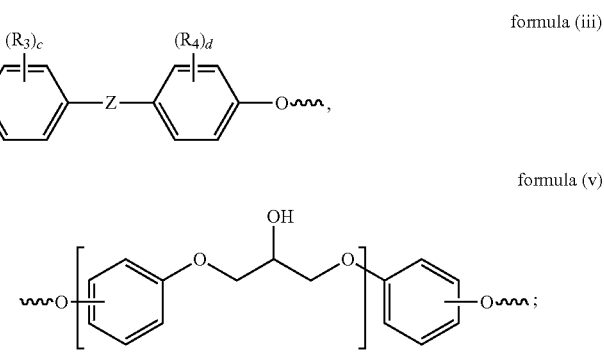

formula (iv)

formula (v)

wherein $R_3$ and $R_4$ are each independently a hydrogen atom, an alkyl group of 1 to 6 carbon atoms, an allyl group, an alkoxy group of 1 to 6 carbon atoms, an aryl group of 6 to 12 carbon atoms, or a halogen atom, $R_5$ is a hydrogen atom, an alkyl group of 1 to 6 carbon atoms, an allyl group, or an alkoxy group of 1 to 6 carbon atoms, $R_6$ is a methylene group, an alkyl group of 5 to 12 carbon atoms or a cycloalkyl group of 5 to 12 carbon atoms, c and d are each independently an integer from 0 to 4. Z is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group, or a structure represented by formula (i) or formula (ii). n is a degree of polymerization, and $1 \leq n \leq 500$, p is an integer from 1 to 11, q is an integer from 0 to 20, and r is an integer from 1 to 15.

According to another aspect of the present disclosure, a manufacturing method for a carbonate-containing epoxy resin includes steps as follows. An aromatic carbonate group-containing structure is provided, wherein the aromatic carbonate group-containing structure includes a structure represented by formula (A1) or formula (A2):

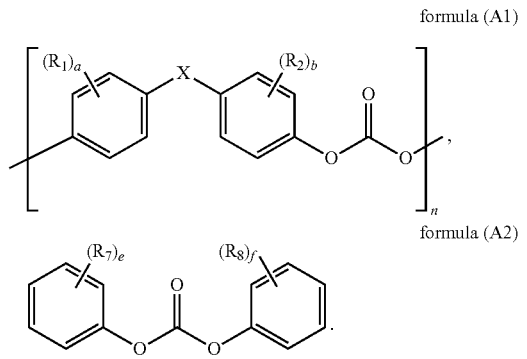

formula (A1)

formula (A2)

An epoxy group-containing structure is provided, wherein the epoxy group-containing structure includes a structure represented by formula (B):

formula (B)

A catalyzing step is performed, wherein the aromatic carbonate group-containing structure is mixed with the epoxy group-containing structure and a catalyst to obtain a carbonate-containing epoxy resin that includes a structure represented by formula (I) or formula (II):

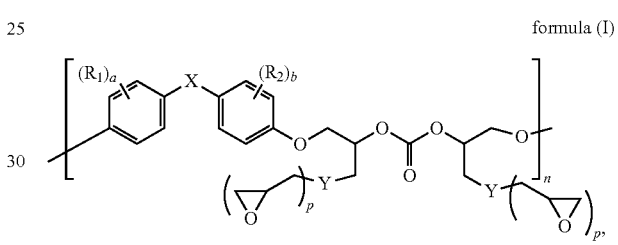

formula (I)

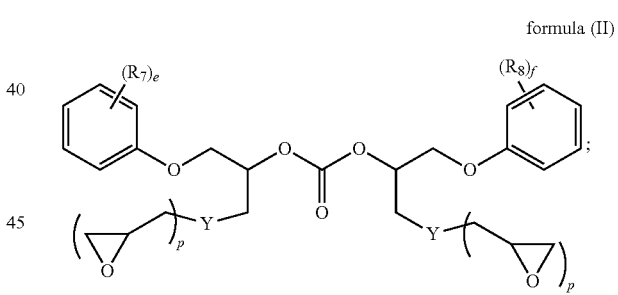

formula (II)

wherein $R_1$, $R_2$, $R_7$ and $R_8$ are each independently a hydrogen atom, an alkyl group of 1 to 6 carbon atoms, an allyl group, an alkoxy group of 1 to 6 carbon atoms, an aryl group of 6 to 12 carbon atoms or a halogen atom, a and b are each independently an integer from 0 to 4, e and f are each independently an integer from 0 to 5. X is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group or a structure represented by formula (i) or formula (ii):

formula (i)

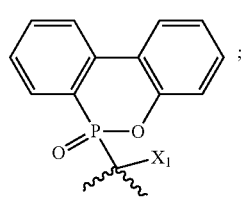

formula (ii)

wherein $X_1$ is a hydrogen atom, an alkyl group of 1 to 6 carbon atoms, or an aryl group of 6 to 12 carbon atoms. Y is an alkyl chain of 1 to 12 carbon atoms, an alkyl ether chain of 1 to 12 carbon atoms, isocyanurate or a structure represented by formula (iii), formula (iv) or formula (v):

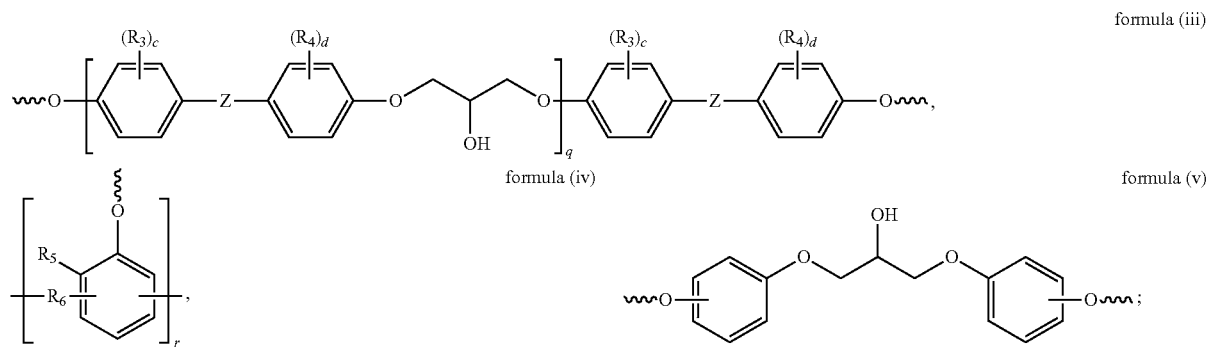

wherein $R_3$ and $R_4$ are each independently a hydrogen atom, an alkyl group of 1 to 6 carbon atoms, an allyl group, an alkoxy group of 1 to 6 carbon atoms, an aryl group of 6 to 12 carbon atoms, or a halogen atom, $R_5$ is a hydrogen atom, an alkyl group of 1 to 6 carbon atoms, an allyl group, or an alkoxy group of 1 to 6 carbon atoms, $R_6$ is a methylene group, an alkyl group of 5 to 12 carbon atoms or a cycloalkyl group of 5 to 12 carbon atoms, c and d are each independently an integer from 0 to 4. Z is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group, or a structure represented by formula (i) or formula (ii). n is a degree of polymerization, and $1 \leq n \leq 500$, m is an integer from 2 to 12, p is an integer from 1 to 11, q is an integer from 0 to 20, and r is an integer from 1 to 15.

According to further another aspect of the present disclosure, an epoxy cured product is provided. The epoxy cured product is obtained by performing a curing reaction with the carbonate-containing epoxy resin according to the aforementioned aspect.

According to still another aspect of the present disclosure, a method for degrading an epoxy cured product includes steps as follows. The epoxy cured product according to the aforementioned aspect is provided. A degrading step is performed, wherein an amine group-containing compound is reacted with the epoxy cured product to degrade the epoxy cured product.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
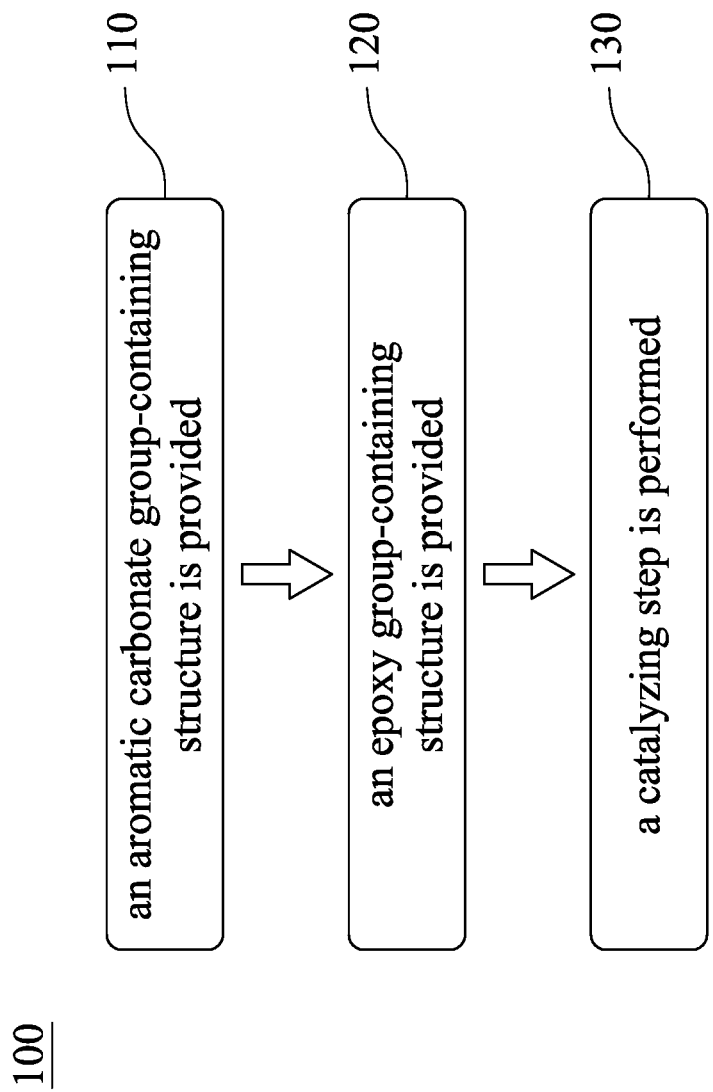
FIG. 1 is a flow chart of a manufacturing method for a carbonate-containing epoxy resin according to one embodiment of the present disclosure.

The present disclosure will be further exemplified by the following specific embodiments. However, the embodiments can be applied to various inventive concepts and can be embodied in various specific ranges. The specific embodiments are only for the purposes of description, and are not limited to these practical details thereof.

In the present disclosure, the compound structure can be represented by a skeleton formula, and the representation can omit the carbon atom, the hydrogen atom and the carbon-hydrogen bond. In the case that the functional group is depicted clearly in the structural formula, the depicted one is preferred.

In the present disclosure, in order to concise and smooth, "carbonate-containing epoxy resin, comprising a structure represented by formula (I)" can be represented as a carbonate-containing epoxy resin represented by formula (I) or a carbonate-containing epoxy resin (I) in some cases, and the other compounds or groups can be represented in the same manner.

A Carbonate-Containing Epoxy Resin

A carbonate-containing epoxy resin is provided of the present disclosure, which includes a structure represented by formula (I) or formula (II):

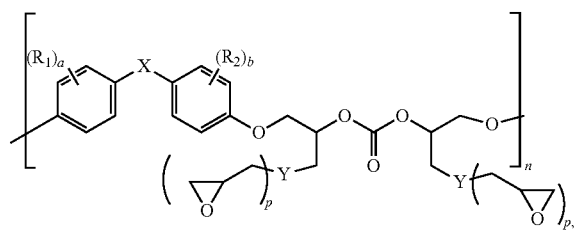

formula (I)

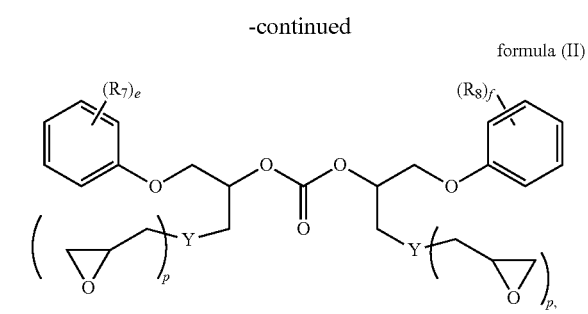

formula (II)

wherein $R_1$, $R_2$, $R_7$ and $R_8$ are each independently a hydrogen atom, an alkyl group of 1 to 6 carbon atoms, an allyl group, an alkoxy group of 1 to 6 carbon atoms, an aryl group of 6 to 12 carbon atoms or a halogen atom, a and b are each independently an integer from 0 to 4, e and f are each independently an integer from 0 to 5. X is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group or a structure represented by formula (i) or formula (ii):

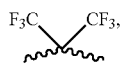

formula (i)

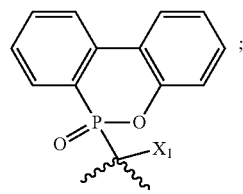

formula (ii)

wherein $X_1$ is a hydrogen atom, an alkyl group of 1 to 6 carbon atoms, or an aryl group of 6 to 12 carbon atoms. Y is an alkyl chain of 1 to 12 carbon atoms, an alkyl ether chain of 1 to 12 carbon atoms, isocyanurate or a structure represented by formula (iii), formula (iv) or formula (v):

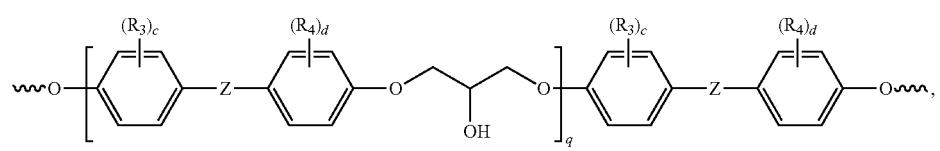

formula (iii)

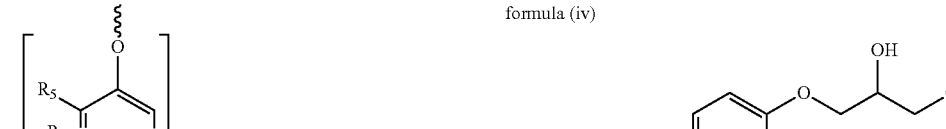

formula (iv)

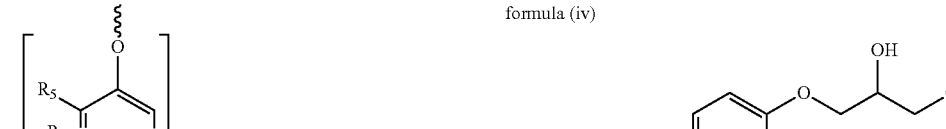

formula (v)

wherein $R_3$ and $R_4$ are each independently a hydrogen atom, an alkyl group of 1 to 6 carbon atoms, an allyl group, an alkoxy group of 1 to 6 carbon atoms, an aryl group of 6 to 12 carbon atoms, or a halogen atom, $R_5$ is a hydrogen atom, an alkyl group of 1 to 6 carbon atoms, an allyl group, or an alkoxy group of 1 to 6 carbon atoms, $R_6$ is a methylene group, an alkyl group of 5 to 12 carbon atoms or a cycloalkyl group of 5 to 12 carbon atoms, c and d are each independently an integer from 0 to 4. Z is a single bond, an alkyl group of 1 to 12 carbon atoms, an cycloalkyl group of 3 to 12 carbon atoms, an oxygen atom, a sulfur atom, the sulfonyl group, a thionyl group, an acyl group, an aryl group of 6 to 12 carbon atoms, a fluorenyl group, or a structure represented by formula (i) or formula (ii). n is a degree of polymerization, and 1 $ n $500, p is an integer from 1 to 11, q is an integer from 0 to 20, and r is an integer from 1 to 15.

Therefore, the carbonate-containing epoxy resin of the present disclosure can be directly used or can perform the subsequent reaction because of having the carbonate structure, and improves its degradability by introducing the carbonate structure to achieve the purpose of chemically recycling.

A Manufacturing Method for a Carbonate-Containing Epoxy Resin

Please refer to FIG. 1, which is a flow chart of a manufacturing method for a carbonate-containing epoxy resin 100 according to one embodiment of the present disclosure. In FIG. 1, the manufacturing method for the carbonate-containing epoxy resin 100 includes a step 110, a step 120 and a step 130.

In the step 110, an aromatic carbonate group-containing structure is provided, wherein the aromatic carbonate group-containing structure includes a structure represented by formula (A1) or formula (A2):

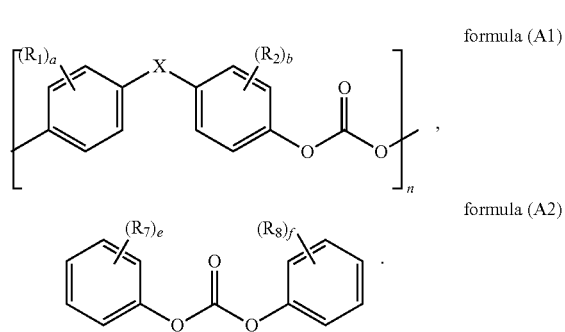

formula (A1)

formula (A2)

The definition of $R_1$, $R_2$, $R_7$, $R_8$, X, a, b, e, f, and n can refer to the aforementioned paragraph, and will not be described herein. Specifically, the aromatic carbonate group-containing structure can be but not limited to a carbonate compound, a new carbonate plastic or a recycled polycarbonate material, and the waste recycled polycarbonate material can be recycled from the waste optical discs, which can reduce the burden on the environment.

In the step 120, an epoxy group-containing structure is provided, wherein the epoxy group-containing structure includes a structure represented by formula (B):

formula (B)

The definition of Y can refer to the aforementioned paragraph, and will not be described herein, wherein m is an integer from 2 to 12.

In the step 130, a catalyzing step is performed, wherein the aromatic carbonate group-containing structure is mixed with the epoxy group-containing structure and a catalyst to obtain a carbonate-containing epoxy resin that includes a structure represented by formula (I) or formula (II):

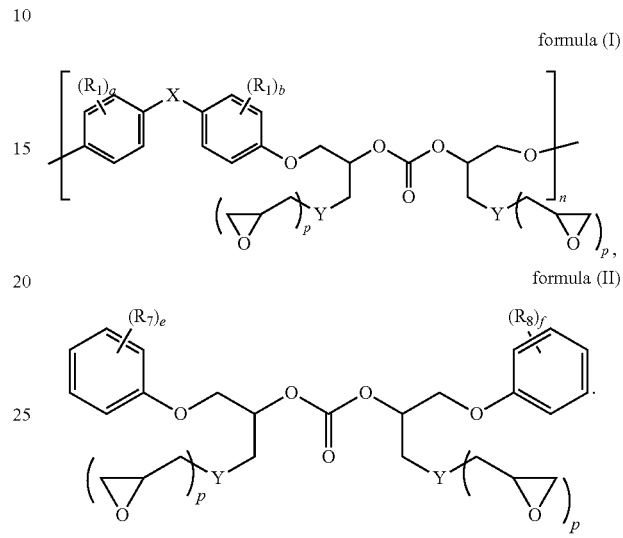

formula (I)

formula (II)

The definition of $R_1$, $R_2$, $R_7$, $R_8$, X, Y, a, b, e, f, p and n can refer to the aforementioned paragraph, and will not be described herein. Furthermore, an equivalence ratio of an epoxy group of the epoxy group-containing structure to a carbonate group of the aromatic carbonate group-containing structure can be 1.3 to 10.0, preferably can be 2.0 to 10.0.

Specifically, when the aromatic carbonate group-containing structure is the structure represented by formula (A1), the carbonate-containing epoxy resin synthesized thereby is the structure represented by formula (I), and the reaction equation is shown in Table 1.

TABLE 1

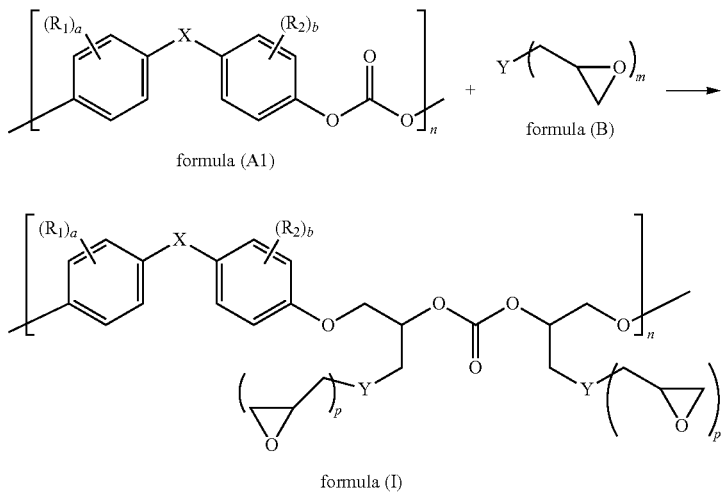

formula (A1)

formula (B)

formula (I)

Furthermore, when the aromatic carbonate group-containing structure is the structure represented by formula (A2), the carbonate-containing epoxy resin synthesized thereby is the structure represented by formula (II), and the reaction equation is shown in Table 2.

TABLE 2

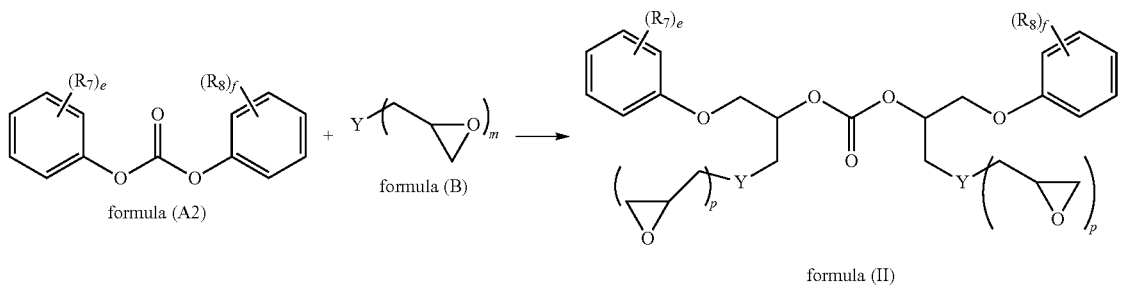

The aforementioned catalyst can include the unshared electron pairs, which is selected from the group consisting of 4-dimethylaminopyridine (DMAP), imidazole, pyridine, 2-methylimidazole, 3-methylimidazole and 2-ethyl-4-methylimidazole. Therefore, the unshared electron pairs of the catalyst can interact with the epoxy group of the epoxy group-containing structure to facilitate the subsequent curing reaction. Specifically, an added amount of the aforementioned catalyst can be from 0.1% by weight to 5% by weight relative to the epoxy group-containing structure.

In detail, the carbonate-containing epoxy resin of the present disclosure utilizes the carbonate group of the aromatic carbonate group-containing structure to react with the epoxy group of the epoxy group-containing structure. In order to prove the above concept, a model reaction is performed in the present disclosure by Synthesis Example 1, diphenyl carbonate and diglycidyl ether of bisphenol A (DGEBA) are reacted under the pyridine catalyst. Specifically, 1.00 g (9.3 mmole) of diphenyl carbonate (107.1 g/eq) and 3.51 g (18.6 mole) of diglycidyl ether of bisphenol A (188 g/eq) are placed in the 100 ml of three-necked flask, the temperature is raised to 100° C. to confirm dissolution, and then 0.0175 g of pyridine catalyst is added and reacted for 8 hours. Afterwards, the product obtained according to Synthesis Example 1 is performed the spectrographic analysis. Hydrogen spectrum data: $^1$H-NMR (CDCl$_3$), δ=1.62 (12H, H$^d$), 2.73 (2H, H$^a$), 2.88 (2H, H$^{a\prime}$), 3.33 (2H, H$^b$), 3.92 (2H, H$^c$), 4.12 (2H, H$^j$), 4.16 (2H, H$^{c\prime}$), 4.25 (4H, H$^l$, H$^{l\prime\prime\prime}$), 4.35 (2H, H$^n$), 5.36 (2H, H$^k$), 6.80 (8H, H$^h$), 6.88 (4H, H$^n$), 6.95 (2H, H$^p$), 7.12 (8H, H$^g$), 7.27 (4H, H$^o$). Carbon spectrum data: $^{13}$C-NMR (CDCl$_3$), δ=31.0 (C$^d$), 41.6 (C$^e$), 44.7 (C$^a$), 50.2 (C$^b$), 67.0 (C$^j$), 68.5 (C$^c$), 68.7 (C$^i$), 74.6 (C$^k$), 113.9 (C$^h$), 114.6 (C$^n$), 121.2 (C$^p$), 127.7 (C$^g$), 129.5 (C$^o$), 143.7 (C$^f$), 154.1 (C$^q$), 156.2 (C$^i$), 158.1 (C$^m$). Infrared spectrum data: FTIR (KBr, cm$^{-1}$): ν=1750 (C=O stretch of carbonyl group). High resolution LC-MS (ESI-MS) m/z: [M$^+$] calcd. for C$_{55}$H$_{58}$O$_{11}$ 894.40 g/mol; anal. 894.4050 g/mol. The theoretical epoxy equivalent is 483.11 g/eq, while the actual epoxy equivalent is 476 g/eq. The reaction equation of Synthesis Example 1 is shown in Table 3, and it is found that the carbonate group can react with the epoxy group.

TABLE 3

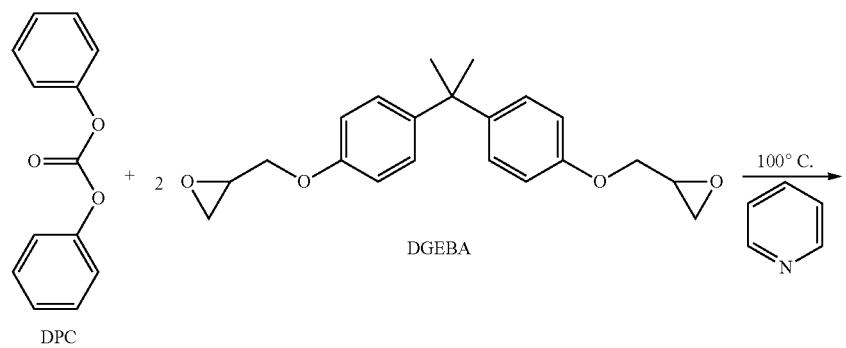

TABLE 3-continued

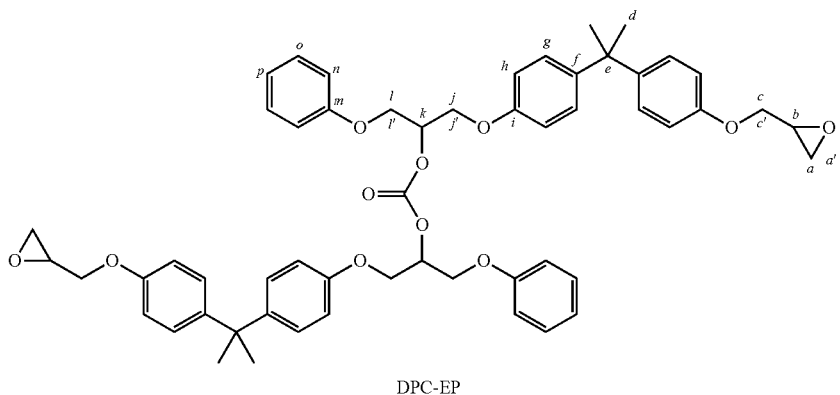

DPC-EP

An Epoxy Cured Product

Figure 2:
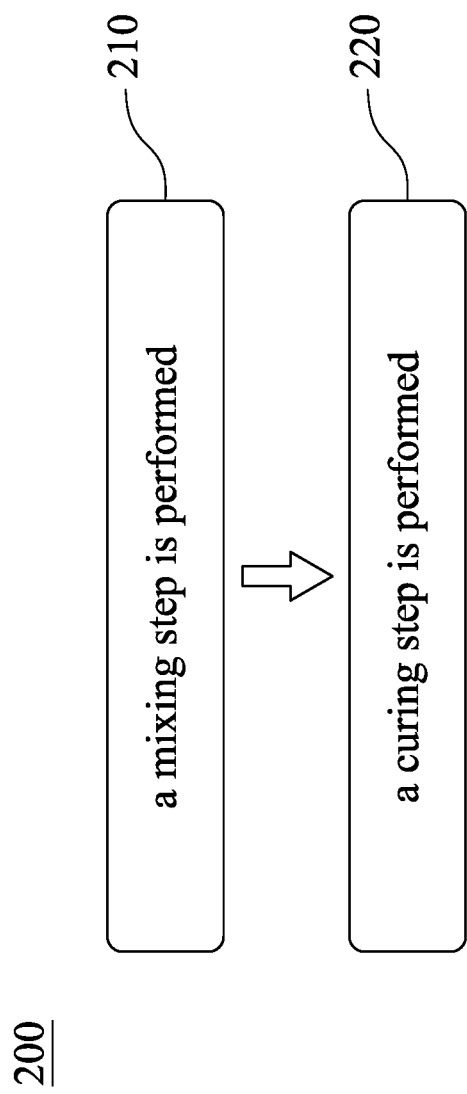
FIG. 2 is a flow chart of a manufacturing method for an epoxy cured product according to another embodiment of the present disclosure.

An epoxy cured product is further provided of the present disclosure, which is obtained by performing a curing reaction with the aforementioned carbonate-containing epoxy resin. The aforementioned curing reaction is referred with FIG. 2, which is a flow chart of a manufacturing method for an epoxy cured product 200 according to another embodiment of the present disclosure. In FIG. 2, the manufacturing method for the epoxy cured product 200 includes a step 210 and a step 220.

In the step 210, a mixing step is performed, wherein the carbonate-containing epoxy resin is mixed with a curing agent to obtain a curable composition. Specifically, the carbonate-containing epoxy resin and the curing agent can form a precursor solution containing the curable composition by the step 210. Moreover, a solvent used in the precursor solution is for helping the carbonate-containing epoxy resin and the curing agent to blend. Therefore, a solvent, which can dissolve the carbonate-containing epoxy resin, the curing agent and do not react with them, can be used in the step 210. The detail of the carbonate-containing epoxy resin can refer to the aforementioned paragraph, and will not be described herein. The curing agent of the present disclosure can be but not limited to a phenolic resin, an amine compound, an active ester compound, a carboxylic acid compound, a cyanate ester compound, an isocyanate compound, an anhydride compound, benzoxazine, polycarbonate or a mixture thereof.

In the step 220, a curing step is performed, wherein the carbonate-containing epoxy resin and the curing agent are cross-linked to form the epoxy cured product. Specifically, the aforementioned curable composition can be directly ground to powder and heated to the molten state, or the precursor solution can be heated, so as to cross-link the carbonate-containing epoxy resin and the curing agent. A curing temperature of the curing reaction can be 80° C. to 240° C., preferably can be 180° C. to 240° C., and the heating time can be 1 hour to 6 hours. More specifically, the aforementioned heating method can adopt a multi-stage heating and curing method, such as heating at 180° C., 200° C., 220° C. for 2 hours, respectively. The curing temperature and heating time can be adjusted flexibly according to the type of the used carbonate-containing epoxy resin and the curing agent, and the present disclosure is not limited thereto.

A Method for Degrading an Epoxy Cured Product

Figure 3:
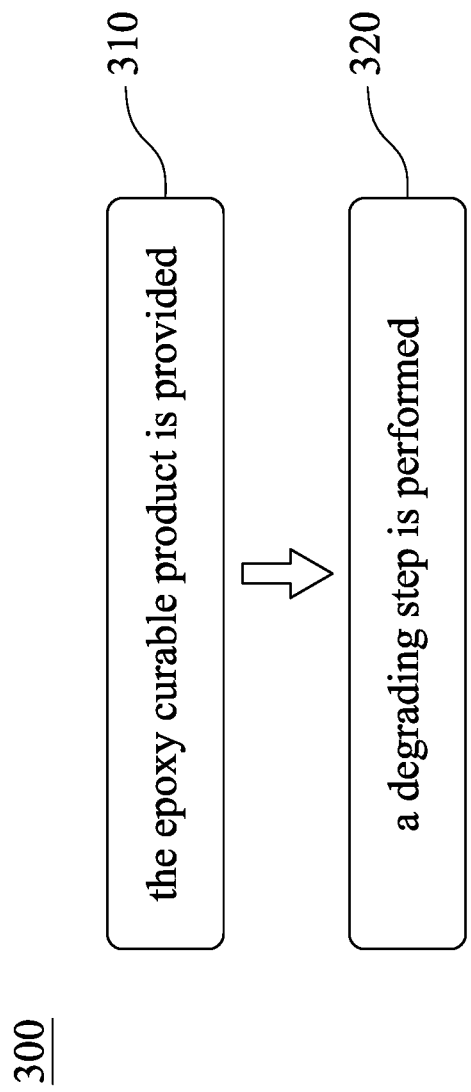
FIG. 3 is a flow chart of a method for degrading an epoxy cured product according to further embodiment of the present disclosure.

Please refer to FIG. 3, which is a flow chart of a method for degrading an epoxy cured product 300 according to further embodiment of the present disclosure. In FIG. 3, the method for degrading the epoxy cured product 300 includes a step 310 and a step 320.

In the step 310, the aforementioned epoxy cured product is provided. In the step 320, a degrading step is performed, wherein an amine group-containing compound is reacted with the aforementioned epoxy cured product to degrade the epoxy cured product.

The present disclosure will be further exemplified by the following specific embodiments so as to facilitate utilizing and practicing the present disclosure completely by the people skilled in the art without over-interpreting and over-experimenting. However, the readers should understand that the present disclosure should not be limited to these practical details thereof, that is, these practical details are used to describe how to implement the materials and methods of the present disclosure and are not necessary.

Example/Comparative Example

Preparation of Carbonate-Containing Epoxy Resin

Example 1: 1.0 g of diphenyl carbonate and 3.51 g of diglycidyl ether of bisphenol A (commodity code BE188 from CHANG CHUN PLASTICS CO., LTD.) are mixed at the equivalence ratio of 1:2, and heating to 100° C. to confirm the dissolution. Further, adding 0.0175 g of pyridine and reacting for 8 hours to obtain the carbonate-containing epoxy resin (DPC-EP) of Example 1, and the epoxy equivalent of Example 1 is 476 g/eq (theoretical value is 483 g/eq).

Example 2: 1.50 g of polycarbonate and 4.44 g of diglycidyl ether of bisphenol A (commodity code BE188 from CHANG CHUN PLASTICS CO., LTD.) are mixed at the equivalence ratio of 1:2, and in the nitrogen environment at 200° C. to present the molten state, then reducing the temperature to 100° C. Further, adding 0.0133 g of pyridine (0.3 wt % DGEBA) and reacting for 8 hours under mechanical stirring to obtain the dark brown viscous liquid. After cooling to the room temperature, the carbonate-containing epoxy resin (WPC-EP2) of Example 2 is obtained, and the epoxy equivalent of Example 2 is 485 g/eq (theoretical value is 503 g/eq).

Example 3: 1.50 g of polycarbonate and 6.66 g of diglycidyl ether of bisphenol A (commodity code BE188 from CHANG CHUN PLASTICS CO., LTD.) are mixed at the equivalence ratio of 1:3, and in the nitrogen environment at 200° C. to present the molten state, then reducing the temperature to 100° C. Further, adding 0.0199 g of pyridine (0.3 wt % DGEBA) and the remaining steps are the same as those in Example 2. The carbonate-containing epoxy resin (WPC-EP3) of Example 3 is obtained, and the epoxy equivalent of Example 3 is 333 g/eq (theoretical value is 345 g/eq).

Example 4: 1.50 g of polycarbonate and 8.88 g of diglycidyl ether of bisphenol A (commodity code BE188 from CHANG CHUN PLASTICS CO., LTD.) are mixed at the equivalence ratio of 1:4, and in the nitrogen environment at 200° C. to present the molten state, then reducing the temperature to 100° C. Further, adding 0.0266 g of pyridine (0.3 wt % DGEBA) and the remaining steps are the same as those in Example 2. The carbonate-containing epoxy resin (WPC-EP4) of Example 4 is obtained, and the epoxy equivalent of Example 4 is 285 g/eq (theoretical value is 293 g/eq).

Figure 4:
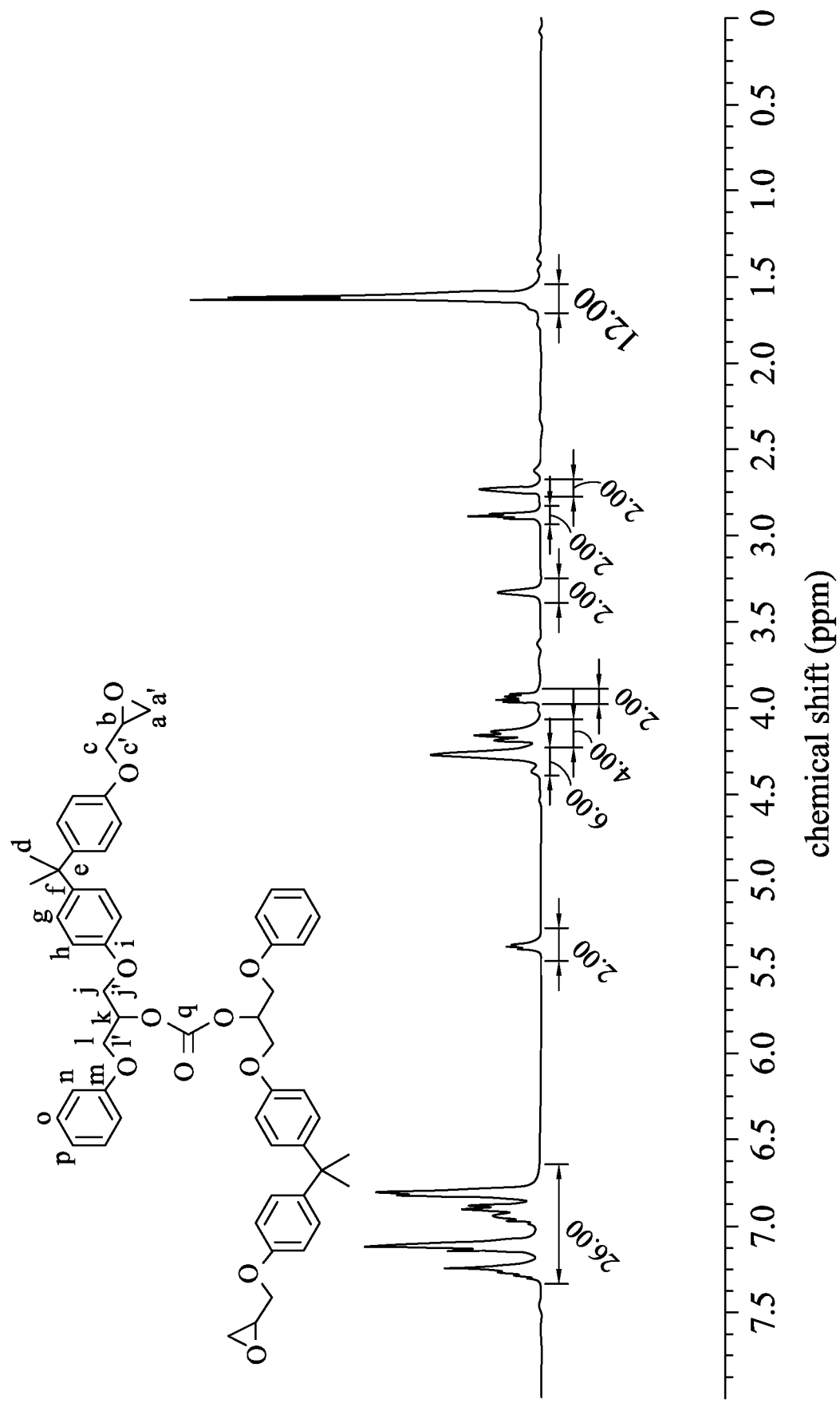
FIG. 4 is a $^1$H-NMR spectrum of Example 1.
Figure 5:
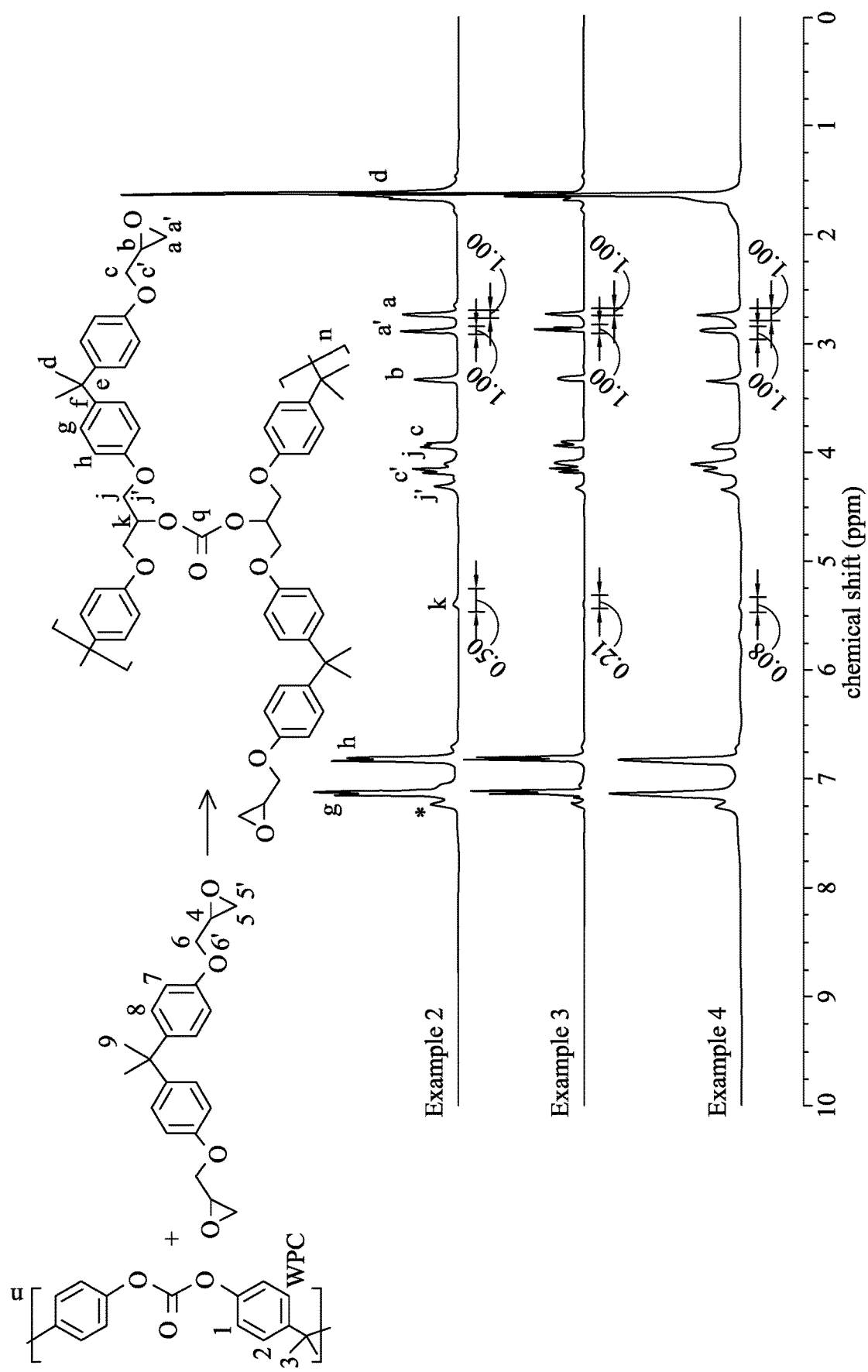
FIG. 5 is a $^1$H-NMR spectrum of Example 2 to Example 4.

Example 1 to Example 4 is performed $^1$H-NMR analysis to confirm the structure of Example 1 to Example 4. Please refer to FIG. 4 and FIG. 5, wherein FIG. 4 is a $^1$H-NMR spectrum of Example 1. FIG. 5 is a $^1$H-NMR spectrum of Example 2 to Example 4. As shown in FIG. 4 and FIG. 5, the products of Example 1 to Example 4 are all the carbonate-containing epoxy resins.

Preparation of Epoxy Cured Product

For the carbonate-containing epoxy resin of Example 1 to Example 4, adding the equal equivalent of the curing agent. First, grinding Example 1 to Example 4 to powder and then heating to 150° C. to present molten state. After stirring evenly, putting into the oven to heat to 160° C. for 1 hour, 180° C. for 2 hours and 200° C. for 2 hours to perform the curing. Alternatively, the carbonate-containing epoxy resin of Example 1 to Example 4 and the curing agent can be stirred to fully melting in a solution with a solid content of 20 wt % by a solvent method, and then poured into a mold to cure to obtain the epoxy cured product of Example 5 to Example 16.

Specifically, the curing agent used in the present disclosure can be diaminodiphenylmethane (DDM), phenolic resin (PN), dicyandiamide (DICY), polycarbonate (PC), diphenyl ether tetracarboxylic acid dianhydride (OPDA) and phthalic anhydride (PAH). Taking Example 2 as an example, when different curing agents are selected, the epoxy cured product prepared is shown in Table 4.

TABLE 4
| curing agent | epoxy curable product |
|---|---|
| DDM | 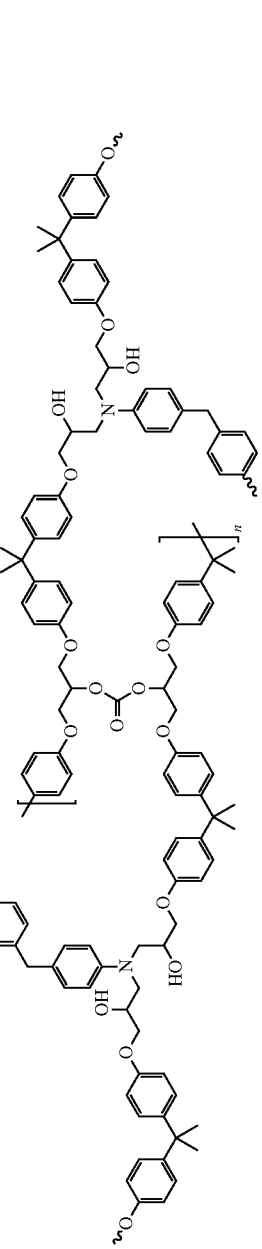 |
| PN | 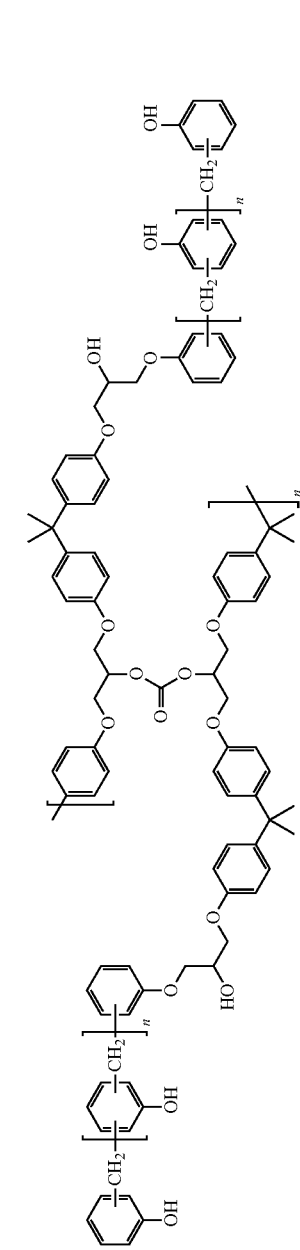 |
| DICY | 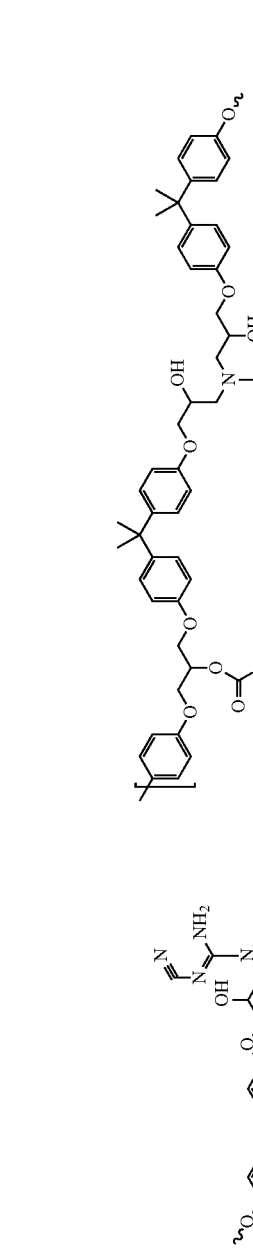 |

TABLE 4-continued

| curing agent | epoxy curable product |
|---|---|
| PC | (structure) |
| ODPA | (structure) |
| PAH | (structure) |

Furthermore, with the commercially available epoxy resin BE188 and BE501, the equal equivalent of the curing agent is added to perform the same curing step as described in Example 5 to Example 16 to obtain the epoxy cured product of Comparative Example 1 to Comparative Example 4.

In detail, taking the addition of the curing agent of diaminodiphenylmethane as an example, adding the equal equivalent means that the number of epoxy equivalent is equal to the number of active hydrogen equivalent. Taking the addition of the curing agent of polycarbonate as an example, adding the equal equivalent means that the number of epoxy equivalent is equal to the number of carbonate group equivalent.

The epoxy resin and the curing agent used in Example 5 to Example 16 and Comparative Example 1 to Comparative Example 4 are shown in Table 5.

TABLE 5

|  | epoxy resin | curing agent |
|---|---|---|
| Example 5 | Example 1 | DDM |
| Example 6 |  | PN |
| Example 7 |  | PC |
| Example 8 | Example 2 | DDM |
| Example 9 |  | PN |
| Example 10 |  | PC |
| Example 11 | Example 3 | DDM |
| Example 12 |  | PN |
| Example 13 |  | PC |
| Example 14 | Example 4 | DDM |
| Example 15 |  | PN |
| Example 16 |  | PC |
| Comparative Example 1 | BE188 | DDM |
| Comparative Example 2 |  | PN |
| Comparative Example 3 | BE501 | DDM |
| Comparative Example 4 |  | PN |

Thermal Property Evaluation

Example 5 to Example 16 and Comparative Example 1 to Comparative Example 4 are performed the thermal property evaluation, and the thermal property evaluation includes a glass transition temperature ($T_g$), 5% thermogravimetric loss temperature ($T_{d5\%}$) and Char yield. The evaluation method is shown as follows.

Glass transition temperature: using the dynamic mechanical analyzer to measure the storage modulus, the relationship between Tan delta curves and the temperature and the glass transition temperature of the epoxy cured product of Example 5 to Example 16 and Comparative Example 1 to Comparative Example 4. Furthermore, using the thermo-mechanical analysis (TMA) to measure the glass transition temperature, and the condition of the thermo-mechanical analysis is detecting at a heating rate of 5° C./min.

5% thermogravimetric loss temperature and Char yield: using thermo-gravimetric analysis (TGA) to measure the 5% thermogravimetric loss temperature and Char yield of 800° C. The condition of thermo-gravimetric analysis is detecting at a heating rate of 20° C./min under the nitrogen atmosphere to measure the weight change of the sample. The 5% thermogravimetric loss temperature refers to the temperature which the weight loss of the cured sample reaches 5%, wherein the higher the 5% thermogravimetric loss temperature, the better the thermal stability of the sample. The Char yield of 800° C. refers to the residual weight ratio of the sample at a heating temperature of 800° C., wherein the higher the residual weight ratio of 800° C., the better the thermal stability of the sample.

The measurement results of the glass transition temperature, the storage modulus, the thermogravimetric loss temperature and the Char yield of Example 5 to Example 16 and Comparative Example 1 to Comparative Example 4 are shown in Table 6.

TABLE 6

|  | $T_g$ (° C.) | $T_{d5\%}$ (° C.) | Char yield (%) | storage modulus (GPa) |
|---|---|---|---|---|
| Example 5 | 150 | 369 | 8 | 1.3 |
| Example 6 | 138 | 375 | 13 | 1.8 |
| Example 7 | 135 | 371 | 6 | 1.9 |
| Example 8 | 149 | 367 | 15 | 1.1 |
| Example 9 | 147 | 414 | 16 | 1.8 |
| Example 10 | 133 | 412 | 7 | 1.9 |
| Example 11 | 165 | 374 | 15 | 1.3 |
| Example 12 | 158 | 404 | 17 | 1.8 |
| Example 13 | 155 | 401 | 8 | 2.1 |
| Example 14 | 170 | 392 | 17 | 1.3 |
| Example 15 | 166 | 409 | 18 | 1.9 |
| Example 16 | 162 | 384 | 11 | 2.2 |
| Comparative Example 1 | 180 | 371 | 12 | 0.9 |
| Comparative Example 2 | 172 | 391 | 4 | 1.6 |
| Comparative Example 3 | 147 | 353 | 14 | 1.4 |
| Comparative Example 4 | 146 | 419 | 10 | 2.6 |

As shown in Table 6, when using DDM as the curing agent, the glass transition temperature of the epoxy cured product obtained is higher than that of other curing agents, indicating that due to the functional number of the DDM curing agent is larger than that of other curing agents, so that the crosslinking density is increased, and the thermal properties are also excellent. However, the 5% thermogravimetric loss temperature is mainly related to the bond after cross-linking. When using PN as the curing agent, the energy required to decompose the ether group is greater than that of the ester group and the amine group, so the epoxy cured product obtained has the excellent 5% thermogravimetric loss temperature. Furthermore, when using PN and DDM as the curing agent, the main chain is mostly benzene ring structure, which can have closer molecules with epoxy resin, so the Char yield is relatively high. In addition, the carbonate-containing epoxy resin of Example 5 to Example 16 of the present disclosure can exhibit the similar thermal properties with the commercially available epoxy cured product resins of Comparative Example 1 to Comparative Example 4 after curing.

Mechanical Property Evaluation

Example 5 to Example 16 and Comparative Example 1 to Comparative Example 4 are performed the mechanical property evaluation. The tensile strength and the elongation at break are measured by the tensile test, wherein the tensile test is measured at the room temperature, and the size of the test piece is 5 cm of length, 1 cm of width, 0.04 mm to 0.10 mm of thickness. The measurement results of the tensile strength and the elongation at break of Example 5 to Example 16 and Comparative Example 1 to Comparative Example 4 are shown in Table 7.

TABLE 7

|  | tensile strength (MPa) | elongation at break (%) |
| --- | --- | --- |
| Example 5 | 46 | 2.2 |
| Example 6 | 62 | 2.7 |
| Example 7 | 67 | 3.5 |
| Example 8 | 39 | 2.4 |
| Example 9 | 62 | 2.5 |
| Example 10 | 65 | 3.1 |
| Example 11 | 45 | 2.1 |
| Example 12 | 64 | 2.4 |
| Example 13 | 72 | 3.0 |
| Example 14 | 45 | 2.0 |
| Example 15 | 66 | 2.3 |
| Example 16 | 74 | 2.8 |
| Comparative Example 1 | 30 | 1.7 |
| Comparative Example 2 | 55 | 2.1 |
| Comparative Example 3 | 49 | 2.0 |
| Comparative Example 4 | 72 | 3.9 |

As shown in Table 7, when using PC as the curing agent, the main chain is longer and the ester group of PC has a certain steric hindrance, which can make the cured product have higher molecular motion, so that the tensile property is more excellent. Furthermore, the carbonate-containing epoxy resin of Example 5 to Example 16 of the present disclosure can exhibit the similar mechanical properties with the commercially available epoxy cured product resins of Comparative Example 1 to Comparative Example 4 after curing, even generally better than the results of Comparative Example 1 to Comparative Example 4.

Degradation Epoxy Cured Product

Example 17 to Example 19 is the result obtained from degradation reaction of the epoxy cured product of Example 8 to Example 10, respectively. Comparative Example 5 to Comparative Example 8 is the result obtained from degradation reaction of the epoxy cured product of Comparative Example 1 to Comparative Example 4, respectively. First, the epoxy cured product films of Example 8 to Example 10 and Comparative Example 1 to Comparative Example 4 and 1-hexylamine are placed in the reactor. After the completion of the reaction, 1-hexylamine is extracted by using the vacuum concentrator to obtain Example 17 to Example 19 and Comparative Example 5 to Comparative Example 8 in which the degradation is completed. The type of epoxy cured product, the reaction temperature, the reaction time and the residual weight of Example 17 to Example 19 and Comparative Example 5 to Comparative Example 8 are shown in Table 8.

TABLE 8

|  | Example 17 | Example 18 | Example 19 |
| --- | --- | --- | --- |
| epoxy curable product | Example 8 | Example 9 | Example 10 |
| reaction temperature (° C.) | 125 | 125 | 125 |
| reaction time (hrs) | 8 | 8 | 2 |
| residual weight (%) | 85 | 77 | 0 |
| epoxy curable product | Comparative Example 5 Comparative Example 1 | Comparative Example 6 Comparative Example 2 |  |
| reaction temperature (° C.) | 125 | 125 |  |
| reaction time (hrs) | 24 | 24 |  |
| residual weight (%) | 100 | 100 |  |
| epoxy curable product | Comparative Example 7 Comparative Example 3 | Comparative Example 8 Comparative Example 4 |  |
| reaction temperature (° C.) | 125 | 125 |  |
| reaction time (hrs) | 24 | 24 |  |
| residual weight (%) | 100 | 100 |  |

Figure 6:
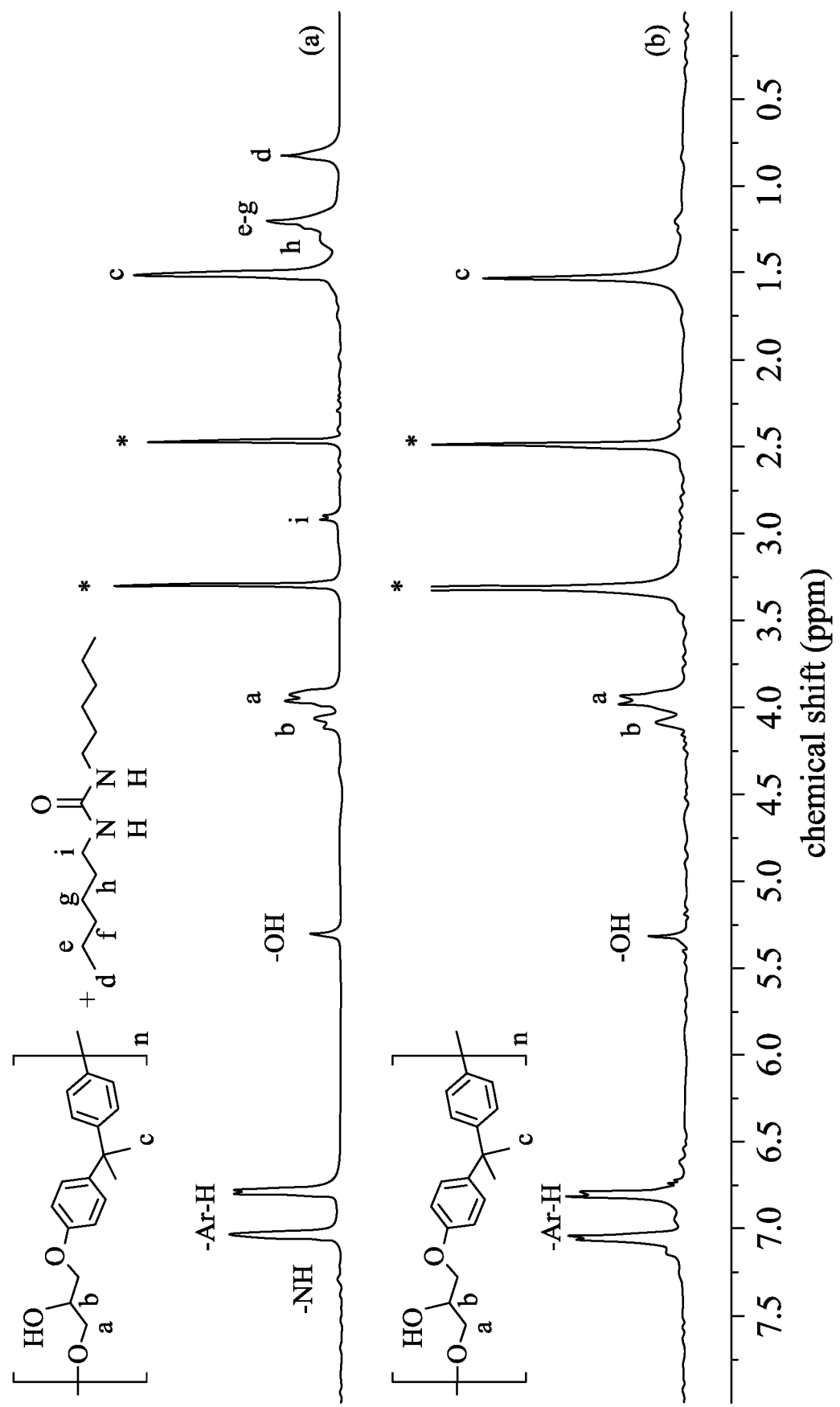
FIG. 6 is a $^1$H-NMR spectrum of Example 19.

Please refer to FIG. 6, which is a $^1$H-NMR spectrum of Example 19. In detail, part (a) in FIG. 6 is a $^1$H-NMR spectrum of the product obtained by distilling 1-hexylamine after the aminolysis reaction of Example 10 with 1-hexylamine. Part (b) in FIG. 6 is a $^1$H-NMR spectrum of the precipitate obtained by distilling 1-hexylamine and pouring methanol after the aminolysis reaction of Example 10 with 1-hexylamine.

As shown in FIG. 6, the characteristic signal of 1,3-dihexylurea can be observed, wherein 7.3 ppm is the amine group signal (NH—CO—NH) of urea structure, the methylene signal is located at 2.9 ppm ($H^f$) and 1.2-1.4 ppm ($H^{e-h}$), the methyl signal is located at 0.8 ppm ($H^d$). Furthermore, the characteristic signal of phenoxy resin can also be observed, wherein 5.3 ppm is the hydroxyl signal, 6.8 and 7.0 ppm are the benzene ring signals, the methine signal and the methylene signal are located at 4.1 ppm ($H^b$) and 3.9 ppm ($H^a$), respectively, and the methyl signal is located at 1.5 ppm ($H^c$). From the results in FIG. 6 and Table 8, it can be indicated that the epoxy cured product of Example 10 of the present disclosure has decomposability after the reaction with the amine group-containing compound, and the residual weight of epoxy cured product is 0%.

Furthermore, Example 8 and Example 9 also have the partial degradability under the heating reaction of 1-hexylamine, wherein the residual weight is 85% and 77%, respectively. However, the epoxy cured product of Comparative Example 1 to Comparative Example 4 obtained from the commercially available epoxy resin do not degrade under the same conditions for a long time to 24 hours, and the residual weight are all 100%. It can be proved that the carbonate-containing epoxy resin synthesized by the present disclosure has the unique degradability, and has a considerable contribution to the recycling and waste reduction of the thermosetting materials.

In conclusion, the carbonate-containing bifunctional or multifunctional epoxy resin of the present disclosure is obtained by a simple one-step reaction. This preparation method can use the recycled waste polycarbonate or carbonate compounds as the raw materials especially, and the atomic efficiency is high, which is favorable for reducing the polycarbonate waste. In addition, the carbonate-containing epoxy resin of the present disclosure can be performed the curing reaction with the curing agent to obtain the epoxy cured product with excellent properties, and has the excellent chemically degradation which can reduce the emission of thermosetting plastic waste and achieving the goal of sustainable utilization.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

The invention claimed is:

1. A carbonate-containing epoxy resin, comprising a structure represented by formula (I) or formula (II):

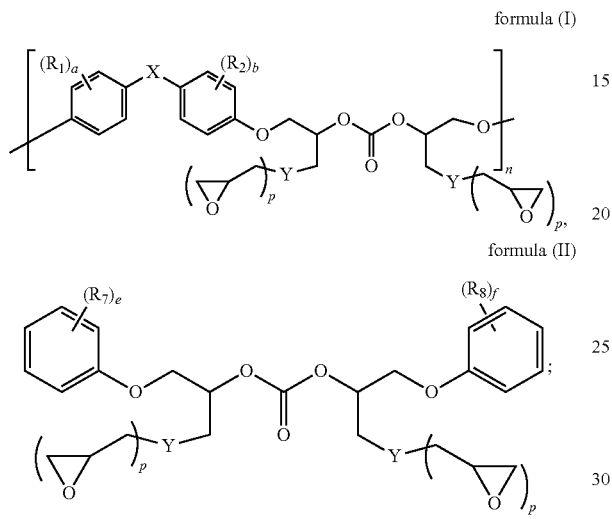

formula (I)

formula (II)

wherein $R_1$, $R_2$, $R_7$ and $R_8$ are each independently a hydrogen atom, an alkyl group of 1 to 6 carbon atoms, an allyl group, an alkoxy group of 1 to 6 carbon atoms, an aryl group of 6 to 12 carbon atoms or a halogen atom, a and b are each independently an integer from 0 to 4, e and f are each independently an integer from 0 to 5;

wherein X is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group or a structure represented by formula (i) or formula (ii):

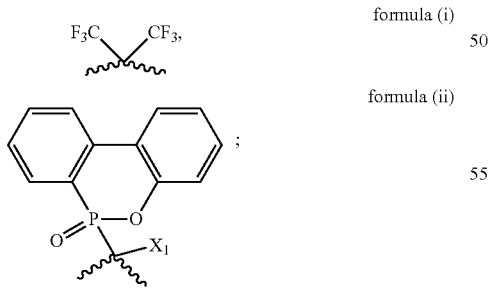

formula (i)

formula (ii)

wherein $X_1$ is a hydrogen atom, an alkyl group of 1 to 6 carbon atoms or an aryl group of 6 to 12 carbon atoms;

wherein Y is an alkyl chain of 1 to 12 carbon atoms, an alkyl ether chain of 1 to 12 carbon atoms, isocyanurate or a structure represented by formula (iii), formula (iv) or formula (v):

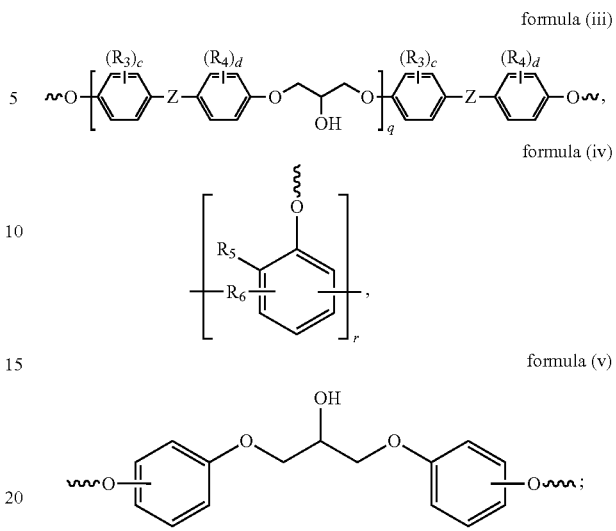

formula (iii)

formula (iv)

formula (v)

wherein $R_3$ and $R_4$ are each independently a hydrogen atom, an alkyl group of 1 to 6 carbon atoms, an allyl group, an alkoxy group of 1 to 6 carbon atoms, an aryl group of 6 to 12 carbon atoms, or a halogen atom, $R_5$ is a hydrogen atom, an alkyl group of 1 to 6 carbon atoms, an allyl group, or an alkoxy group of 1 to 6 carbon atoms, $R_6$ is a methylene group, an alkyl group of 5 to 12 carbon atoms or a cycloalkyl group of 5 to 12 carbon atoms, c and d are each independently an integer from 0 to 4;

wherein Z is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group, or a structure represented by formula (i) or formula (ii); and wherein n is a degree of polymerization, and $1 \leq n \leq 500$, p is an integer from 1 to 11, q is an integer from 0 to 20, and r is an integer from 1 to 15.

2. A manufacturing method for a carbonate-containing epoxy resin, comprising:

providing an aromatic carbonate group-containing structure, wherein the aromatic carbonate group-containing structure comprises a structure represented by formula (A1) or formula (A2):

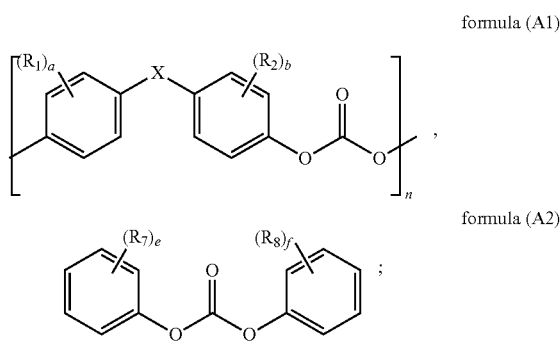

formula (A1)

formula (A2)

providing an epoxy group-containing structure, wherein the epoxy group-containing structure comprises a structure represented by formula (B):

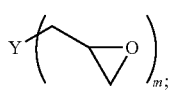
formula (B)

and performing a catalyzing step, wherein the aromatic carbonate group-containing structure is mixed with the epoxy group-containing structure and a catalyst to obtain a carbonate-containing epoxy resin that comprises a structure represented by formula (I) or formula (II):

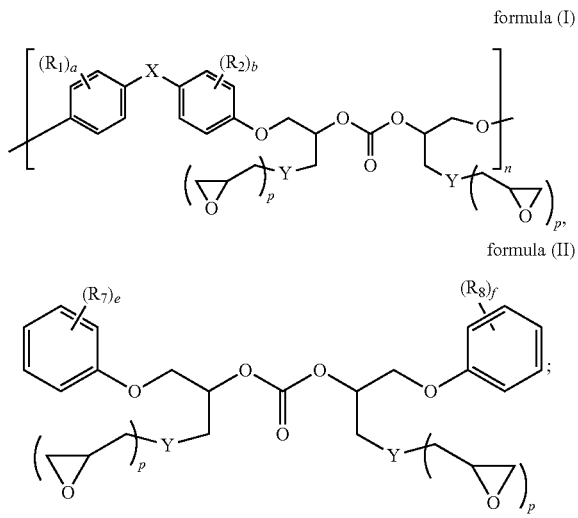

formula (I)

formula (II)

wherein $R_1$, $R_2$, $R_7$ and $R_5$ are each independently a hydrogen atom, an alkyl group of 1 to 6 carbon atoms, an allyl group, an alkoxy group of 1 to 6 carbon atoms, an aryl group of 6 to 12 carbon atoms or a halogen atom, a and b are each independently an integer from 0 to 4, e and f are each independently an integer from 0 to 5;

wherein X is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group or a structure represented by formula (i) or formula (ii):

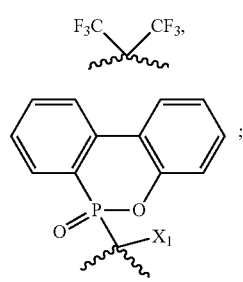

formula (i)

formula (ii)

wherein $X_1$ is a hydrogen atom, an alkyl group of 1 to 6 carbon atoms or an aryl group of 6 to 12 carbon atoms;

wherein Y is an alkyl chain of 1 to 12 carbon atoms, an alkyl ether chain of 1 to 12 carbon atoms, isocyanurate or a structure represented by formula (iii), formula (iv) or formula (v):

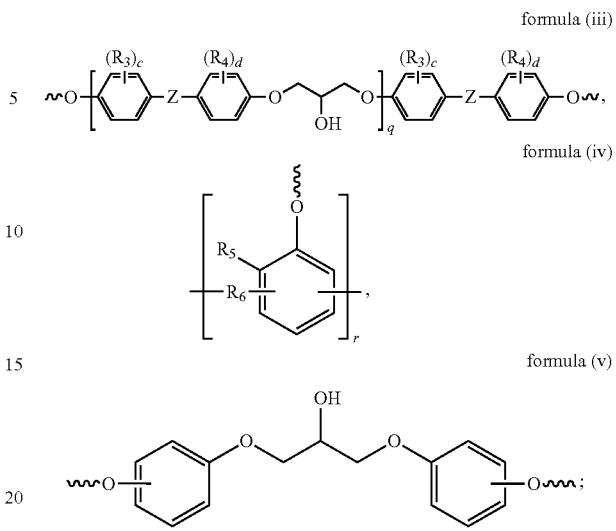

formula (iii)

formula (iv)

formula (v)

wherein $R_3$ and $R_4$ are each independently a hydrogen atom, an alkyl group of 1 to 6 carbon atoms, an allyl group, an alkoxy group of 1 to 6 carbon atoms, an aryl group of 6 to 12 carbon atoms, or a halogen atom, $R_5$ is a hydrogen atom, an alkyl group of 1 to 6 carbon atoms, an allyl group, or an alkoxy group of 1 to 6 carbon atoms, $R_6$ is a methylene group, an alkyl group of 5 to 12 carbon atoms or a cycloalkyl group of 5 to 12 carbon atoms, c and d are each independently an integer from 0 to 4;

wherein Z is a single bond, an alkyl group of 1 to 12 carbon atoms, a cycloalkyl group of 3 to 12 carbon atoms, an oxygen atom, a sulfur atom, a sulfonyl group, a thionyl group, an acyl group, an aryl group of 6 to 12 carbon atoms, a fluorenyl group, or a structure represented by formula (i) or formula (ii); and wherein n is a degree of polymerization, and $1 \leq n \leq 500$, m is an integer from 2 to 12, p is an integer from 1 to 11, q is an integer from 0 to 20, and r is an integer from 1 to 15.

3. The manufacturing method for the carbonate-containing epoxy resin of claim 2, wherein the catalyst is selected from the group consisting of 4-dimethylaminopyridine, imidazole, pyridine, 2-methylimidazole, 3-methylimidazole and 2-ethyl-4-methylimidazole.

4. The manufacturing method for the carbonate-containing epoxy resin of claim 3, wherein an added amount of the catalyst is ranged from 0.1% by weight to 5% by weight relative to the epoxy group-containing structure.

5. The manufacturing method for the carbonate-containing epoxy resin of claim 2, wherein an equivalence ratio of an epoxy group of the epoxy group-containing structure to a carbonate group of the aromatic carbonate group-containing structure is 1.3 to 10.0.

6. An epoxy cured product, which is obtained by performing a curing reaction with the carbonate-containing epoxy resin of claim 1.

7. The epoxy cured product of claim 6, wherein the curing reaction is completed by mixing the carbonate-containing epoxy resin and a curing agent and heating.

8. The epoxy cured product of claim 7, wherein the curing agent is a phenolic resin, an amine compound, an active ester compound, a carboxylic acid compound, a cyanate ester compound, an isocyanate compound, an anhydride compound, benzoxazine, polycarbonate or a mixture thereof.

9. The epoxy cured product of claim 7, wherein a curing temperature of the curing reaction is 180° C. to 240° C.

10. A method for degrading the epoxy cured product of claim 6, comprising:
   providing the epoxy cured product; and
   performing a degrading step, wherein an amine group-containing compound is reacted with the epoxy cured product to degrade the epoxy cured product.

* * * * *